United States Patent [19]
Bostrom et al.

[11] Patent Number: 5,496,908
[45] Date of Patent: Mar. 5, 1996

[54] WATER-SOLUBLE POLYURETHANE AND USE THEREOF TO THICKEN WATER-BASED SYSTEMS SUCH AS WATER-BASED PAINTS

[75] Inventors: Peter Bostrom, Kungälv; Annelie Askenbom, Stenungsund; Eva Gottberg-Klingskog, Frölunda, all of Sweden

[73] Assignee: Berol Nobel AB, Stenungsund, Sweden

[21] Appl. No.: 204,369

[22] PCT Filed: Sep. 9, 1993

[86] PCT No.: PCT/SE93/00732

§ 371 Date: Mar. 16, 1994

§ 102(e) Date: Mar. 16, 1994

[87] PCT Pub. No.: WO94/06840

PCT Pub. Date: Mar. 31, 1994

[30] Foreign Application Priority Data

Sep. 15, 1992 [SE] Sweden ................................. 9202648

[51] Int. Cl.⁶ .................................................. C08G 18/48
[52] U.S. Cl. ................. 528/74.5; 528/76; 528/77; 528/78; 528/71; 524/591; 524/839; 524/507; 524/804
[58] Field of Search ................. 528/69, 74.5, 76, 528/77, 78; 524/591, 839, 507, 804

[56] References Cited

U.S. PATENT DOCUMENTS 4,079,028  3/1978  Emmons et al. .................. 260/29.6

FOREIGN PATENT DOCUMENTS

| 0096882 | 12/1983 | European Pat. Off. . |
| 0127950 | 12/1984 | European Pat. Off. . |
| 0151748 | 8/1985 | European Pat. Off. . |
| 0301718 | 2/1989 | European Pat. Off. . |
| 0307775 | 3/1989 | European Pat. Off. . |
| 0317258 | 5/1989 | European Pat. Off. . |
| 0498442 | 8/1992 | European Pat. Off. . |
| 92/08753 | 5/1992 | WIPO . |

*Primary Examiner*—James J. Seidleck
*Assistant Examiner*—R. F. Johnson
*Attorney, Agent, or Firm*—Spencer & Frank

[57] ABSTRACT

A water-soluble polyurethane, including a polymer backbone; end groups provided on the ends of the polymer backbone and containing water-soluble oxyethylene groups having a molecular weight ranging from 400 to 15,000, and groups pendant from the polymer backbone and containing hydrocarbon groups having 8–22 carbon atoms, in a number of at least 0.1 per urethane bond. The water-soluble polyurethane has moderate viscosities in aqueous solution and is especially useful as a thickener, for instance, in alkyd- or latex-based paints.

14 Claims, No Drawings

WATER-SOLUBLE POLYURETHANE AND USE THEREOF TO THICKEN WATER-BASED SYSTEMS SUCH AS WATER-BASED PAINTS

BACKGROUND OF THE INVENTION

1. Field of the Invention

The present invention relates to a polyurethane having a thickening effect. It is especially well suited for use in water paints as viscosity agent.

2. Description of the Related Art

In an attempt to reduce the utilisation of solvents in paint compositions, water paints have been developed over the past 15 years, primarily for indoor use. As a rule, these paints contain an acrylate dispersion as binder. With the new water paints it is desirable to achieve, if possible, the same good properties as in paints based on alkyd as binder. This means, among other things, high gloss, water-insensitive film, good levelling and application properties resembling those of alkyd paints. Levelling and application properties are affected to a great extent by the choice of thickener. Traditional thickeners, such as cellulose derivatives and polyacrylate, provide insufficient levelling in these paints. So-called associative thickeners of polyacrylate and poly-urethane type have therefore been developed, which provide excellent levelling. The associative polyacrylate thickeners are supplied as an acid aqueous dispersion. One draw-back of these products is their sensitivity to water and alkali. The associative polyurethane thickeners do not suffer from this drawback and, therefore, are extensively used as thickeners in gloss paints.

U.S. Pat. No. 4,079,028 discloses an associative, linear polyurethane thickener containing two hydrophobic end groups and in the polymer backbone hydrophilic ether groups and hydrophobic isocyanate groups. European Patent Applications 127,950 and 307,775 describe associative polyurethane thickeners obtained by reacting a polyisocyanate with a polyetherpolyol, a modifier having two reactive groups and one end-blocking agent. The latter European patent application also states that the modifier should contain a pendant hydrophobic group having 10 carbon atoms. From the production method appears that these pendant hydrophobic groups are preferably located at the end groups.

From U.S. Pat. No. 4,426,485 it is also previously known to enhance the thickening effect of a polyurethane by providing it with hydrophobic segments containing at least two monovalent hydrophobic groups. All these thickeners have however proved, even at low concentrations in water, to give high viscosities. This applies in particular to the types of polyurethane thickeners disclosed in European Patent Applications 127,950 and 307,775 as well as U.S. Pat. No. 4,426,485.

The aim of reducing the amount of solvent in water paints entails however that high viscosity in water for a polyurethane thickener is not desirable for two reasons.

First, one wishes to be able to supply the polyurethane thickener dissolved in water with a maximum dry matter content and minimum viscosity. If the viscosity of the polyurethane thickener in water is too high, it may become necessary to use a combination of water and organic, water-miscible solvent to reduce the viscosity. Commercial polyurethane thickeners therefore generally contain propylene glycol or butyl carbitol to achieve a dry matter content of 15–40%.

Second, one wishes in paints, and especially gloss paints, to have a predetermined application viscosity at a shear rate of about 10,000 $s^{-1}$. The viscosity at low shear rates, traditionally measured as a Stormer viscosity, however becomes too high with the associative polyurethane thickeners having high viscosity in water. Although the viscosity of a gloss paint at low shear rates can be reduced by adding surfactants or solvents of butyl carbitol type, these two approaches however entail considerable drawbacks in respect of the properties of the paint. Therefore, it is important to use thickeners which impart the right viscosity to the paint, both at low and at high shear rates.

SUMMARY OF THE INVENTION

It has now been found that a new type of water-soluble associative polyurethanes have moderate viscosities in aqueous solution. With this type of polyurethane, it is possible, without any solubility-mediating additives, to produce aqueous solutions having an acceptable viscosity at dry matter contents in the range of about 30–50% by weight. Moreover, it provides in gloss paints a suitable viscosity at both low and high shear rates. The polyurethane according to the invention is characterised by exhibiting a) water-soluble oxyethylene-group-containing end groups having a molecular weight of 400–15,000, preferably 1,000–8,000, and b) groups pendant from the polymer backbone and containing hydrocarbon groups having 8–22 carbon atoms, preferably 10–14 carbon atoms, in a number of at least 0.1 per urethane bond, preferably at least 0.4 per urethane bond.

The polyurethanes according to the invention thus belong to the group of comb polymers. By their structure, hydrophobic hydrocarbon groups will be pendant from the polymer backbone at quite regular intervals, while the polymer ends are hydrophilic in nature. By this structure, the polyurethane has been found to have special properties which differ from those of previously known associative polyurethane thickeners and make it especially well suited for use as a thickener in paints.

The polyurethanes according to the invention have relatively low viscosity in aqueous solution, but when added to a water-base latex- or emulsion paint, a desirable increase of the application viscosity of the paint is obtained. The polyurethanes can be used as sole thickener, but also in combination with other thickeners, such as associative cellulose ethers. The paints suitably have a PVC value (pigment-volume-concentration) of 15–80%. The polyurethanes are especially suitable as thickeners for gloss paints, e.g.paints having a PVC value of 15–25%. Suitable binders are emulsion binders, such as alkyd resins, and latex binders, such as polyvinyl acetate, polyacrylates, copolymers of vinyl acetate and ethylene, copolymers of vinyl acetate, ethylene and vinyl chloride and copolymers of styrene and acrylate. Preferred binders are latex binders stabilised with anionic surfactants. The added amount of polyurethanes varies depending on both the composition of the paint and the chemical structure of the polyurethane, but generally is 0.1–1.5% of the weight of the paint.

The water-soluble end groups preferably have the formula

wherein A is an oxyalkylene group having 2–4 carbon atoms; B is a trivalent group, preferably nitrogen or the group —OCHCH($R_3$)O—; $R_1$ is a group containing a monovalent hydrocarbon group having 1–22 carbon atoms, preferably 1–14 carbon atoms, hydrogen or the group (A)$_s$H, $R_3$ is hydrogen or a hydrocarbon group having 1–7 carbon atoms, t is 0 or 1 and p, r and s, independently of each other, are 1–100, preferably 20–80, the sum of p, r and s being at least 10, preferably at least 25.

According to a preferred embodiment, at least 50% by weight, preferably at least 75% by weight, of the polyurethane consists of the segment

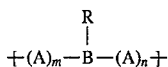 (IIa)

wherein R is a hydrophobic group, containing a monovalent hydrocarbon group having 8–22, preferably 10–14 carbon atoms, A and B are as above, m and n are 20–140, m+n being 50–200, preferably 80–120, and the number of oxyethylene groups is such that the polyurethane becomes water-soluble, and the segment

 (IIb)

wherein T is a bivalent hydrocarbon group. Suitably, T has 1–24 carbon atoms, preferably 4–15 carbon atoms.

In its simplest form, the polyurethane can be produced in a single step by polymerising a water-soluble diol compound of the formula

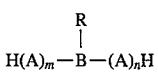 (III)

wherein R, A, B, m and n are as above, with a diisocyanate of the formula

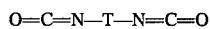 (IV)

wherein T is as above, the compound (III) being in a molar excess. The following equation is valid theoretically for the molecular weight of the polymer.

$$Mv = Mr \times Xn$$

$$Xn = \frac{1+r}{1+r-2\,rp}$$

wherein

Mv=average molecular weight of polymer

Mr=molecular weight of repeating unit

Xn=average number of repeating units r=molar ratio of diisocyanate/diol compound p=conversion The polyurethane according to the invention may, if so desired, be modified by reacting compounds III and IV with an excess of compound IV, and thereafter reacting the resulting intermediate product with a water-soluble compound of the formula

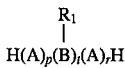 (V)

wherein $R_1$, A, B, t, p and r are as above, but with the exception of the compounds comprised by formula III. It is also possible, within the scope of the invention, to replace a minor portion of compound III with such diol compounds as are comprised by formula V, thus making it possible to modify the ratio of pendant hydrophobic groups to the number of hydrophobic groups in the polymer backbone. By adjusting the value of n, m, r, t, p and s, the number of carbon atoms in R and $R_1$, the type and the amount of modifying segments and the molecular weight, there are many possibilities of optimising the thickener to the paint composition and the desired properties.

Polymerisation is generally conducted at a temperature of 70°–150° C. in the presence of a conventional catalyst, such as dibutyltin dilaurate. If so desired, the reaction can be conducted in the presence of an inert solvent, such as xylene, toluene, N-methylpyrrolidone or propylene carbonate, but is preferably conducted without solvent. The amounts of the compounds involved and the production method are suitably adapted such that the polyurethane will have a theoretical average molecular weight of 20,000–300,000, preferably 50,000–200,000, and a viscosity of 100–20,000 mPa.s, preferably 500–10,000 mPa.s measured in a 20% aqueous solution at 20° C. according to Brookfield at 12 rpm. Suitably, the number of R groups is on average 10–100, preferably 25–50. After completed polymerisation, water can be added as solvent. The aqueous solution of the polyurethane is weakly alkaline (pH 9–10) because of the content of amine groups. By neutralising to a pH of $\leq 7$, preferably 5–7, the viscosity of the polyurethane can be reduced.

The diisocyanate of formula IV may be linear or branched, aliphatic, cycloaliphatic or aromatic. Examples of suitable diisocyanates for use in the production of the polyurethane according to the invention are 1,4-tetramethylene diisocyanate, 1,6-hexamethylene diisocyanate, 2,2,4-trimethyl-1,6-diisocyanatohexane, 1,10-decamethylene diisocyanate, 1,4-cyclohexylene diisocyanate, bis(4-isocyanatocylohexyl)methane, 1-isocyanato-3-isocyanato-methyl-3,5,5-trimethyl-cyclohexane, m- and p-phenylene diisocyanate, 2,6- and 2,4-tolylene diisocyanate, xylene diisocyanate, 4,4'-diphenylene diisocyanate, 4,4'-diphenylmethane diisocyanate, 1,5-naphthylene diisocyanate and polymethylene polyphenyl isocyanates. Isocyanates having a functionality higher than 2 can also be used, but to a limited extent to avoid the formation of cross-linked, water-insoluble gels. Generally, the content of isocyanates with a functionality above 2 is less than 10% of those which are bifunctional.

Compounds of formula III have at least two hydrophilic hydroxyl-containing groups and at least one pendant hydrophobic group. There may be produced, for instance by ethoxylating suitable fatty amines or diols from olefin epoxides and glycidyl ethers. In formula III, R is e.g. a hydrocarbon group having 8–22 carbon atoms or a corresponding acyl group derived from an amide ethoxylate. The hydrocarbon group may be linear or branched, saturated or unsaturated, aliphatic, cycloaliphatic or aromatic. Specific examples of such groups are decyl, docecyl, tetradecyl, hexadecyl, butyl phenyl, octyl phenyl, nonyl phenyl or dodecyl phenyl or alkyl alkenyl or acyl groups derived from coconut fatty acids, tall fatty acids or other fatty acids.

The group R may also consist of the group $R_2O(A)_zCH_2$—, $R_2O(A)_zCH_2CH(OH)CH_2(A)_z$—, $R_2CH(OH)CH_2(A)_z$— or the group $R_2(A)_z$—, wherein $R_2$ is a hydrocarbon group having 8–22 carbon atoms, A is as above, and z is a number of 0–50, preferably 0–20. The ethylenoxy groups make up preferably at least 50% of the number of alkylenoxy groups. The hydrocarbon group $R_2$ may be linear or branched, saturated or unsaturated, aliphatic, cycloaliphatic or aromatic. Specific examples of such groups are decyl, dodecyl, tetradecyl, hexadecyl, butyl phenyl, octyl phenyl, nonyl phenyl and dodecyl phenyl.

The modifying compound of formula V, which does not comprise compounds of formula III, i.e. compounds where t=1, R and $R_1$, m and p and n and r are pairwise equal, may, for instance, consist of compounds where $R_1$ is a hydrocarbon group or an acyl group having 1–7 carbon atoms or where $R_2$ in the above-mentioned groups is a hydrocarbon group having 1–7 carbon atoms. In these cases, the hydrocarbon group may be linear or branched, saturated or unsaturated, aliphatic, cycloaliphatic or aromatic. In the case where t=0, formula V comprises, for instance, polyethylene glycol having a molecular weight of 1,000–5,000.

DESCRIPTION OF THE PREFERRED EMBODIMENTS

The present invention and the advantage gained thereby are further illustrated by the following Examples.

EXAMPLE 1

To 101 g of an aminoethoxylate (1 mole of Jafamin P-M+150 moles of EO) having 20–22 carbon atoms was added 3.07 g of isophorone diisocyanate at 120° C., and after 15 min 300 ppm dibutyltin dilaurate was added to the reaction mixture, whereupon the temperature was gradually increased to 140° C. The reaction was allowed to proceed for about 6 h. The resulting polyurethane was highly viscous and had in a 5% aqueous solution a viscosity (Brookfield, 12 rpm) of 10,000 mPa·s. The theoretical molecular weight was 100,000.

EXAMPLE 2

To coconut fatty amine was added ethylene oxide in an amount of 150 moles of ethylene oxide per mole of coconut fatty amine. To 246.8 g of the ethoxylate dissolved in 100 g of N-methylpyrrolidone was added 7.54 g of isophorone diisocyanate at 90° C., and after 10 min was added 0.15 g of dibutyltin dilaurate. The reaction was allowed to proceed at 100° C. for 6 h. The resulting polyurethane had a viscosity in a 20% aqueous solution of 1,800 mPa·s. The theoretical molecular weight was 200,000.

EXAMPLE 3

To coconut fatty amine was added ethylene oxide in an amount of 150 moles of ethylene oxide per mole of coconut fatty amine. In toluene solution, 100 g of this ethoxylate was reacted with 3.2 g of 4,4'-diphenylmethane diisocyanate in the presence of 0.03 g of dibutyltin dilaurate at a temperature of 80°–100° C. After the reaction, toluene was driven off. The viscosity of the resulting polyurethane was 7,000 mPa·s in a 50% aqueous solution according to Brookfield, 12 rpm. The theoretical molecular weight was 50,000.

EXAMPLE 4

300.8 g of a coconut fatty amine ethoxylate (1 mole of amine+96 moles of EO) was reacted in accordance with Example 1 with 14.69 g of isophorone diisocyanate. The resulting polyurethane had in a 20% aqueous solution a viscosity of 2,000 mPa·s measured according to Brookfield, 12 rpm. After neutralisation of the 20% polyurethane solution with acetic acid to a pH of 6, a viscosity of 300 mPa·s was measured. The theoretical molecular weight was 200,000.

EXAMPLE 5

305.1 g of a coconut fatty amine ethoxylate (1 mole of amine+74 moles of EO) was reacted with 19.1 g of isophorone diisocyanate according to Example 1. The viscosity of the resulting polyurethane in a 20% aqueous solution was 2,500 mPa·s measured according to Brookfield, 12 rpm. The theoretical molecular weight was 200,000.

Comparative Example 1

Comparative Example 1

A polyurethane was produced in accordance with U.S. Pat. No. 4,426,485. 300 g of polyethylene glycol having a molecular weight of 4,000 was reacted at 75° C. for 3 h with 16.34 g of isophorone diisocyanate in the presence of 0.475 g of dibutyltin dilaurate as catalyst and 900 g of toluene as solvent.

To the resulting reaction mixture, containing polyethylene glycol-terminated polyurethane, was added 17.46 g of octadecyl isocyanate, whereupon the reactants were allowed to react with one another for 96 h at 60° C. Excess octadecyl isocyanate was removed by extraction with hexane.

The viscosity of the resulting polyurethane was 25,700 mPa·s in a 10% aqueous solution according to Brookfield, 12 rpm.

EXAMPLE 6

A high-gloss paint was produced by first preparing a pigment dispersion having the following composition.

| Component | Parts by weight |
| --- | --- |
| Water | 64 |
| Polyacrylic acid salt (DISPEX G40) | 4 |
| Block polymer (BERMODOL DEF 2400) | 1 |
| Propylene glycol | 64 |
| Sulphosuccinate | 1 |
| Bactericide (NUOSEPT 95) | 1 |
| Titanium dioxide (KRONOS 2190) | 215 |

350 parts by weight of this pigment dispersion were mixed with 642 parts by weight of the following binder dispersion, the polyurethane thickener being not included.

| Component | Parts by weight |
| --- | --- |
| Polyurethane | Acc. to Table |
| Water | 33 |
| $C_{12}$-ester alcohol (TEXANOL) | 46 |
| Acrylate latex (RHOPLEX HG44) | 560 |
| Anti-foaming agent (BYK 035) | 3 |

The resulting paint had a pigment-volume-concentration (PVC) of 20% and a gloss value of 75 measured at 60° according to SS 184184. The resulting paint was tested for Stormer- and ICI-viscosity, i.e. at low and high shear rates, respectively. A high ICI-viscosity is essential for good film formation and hiding power. The following results were obtained.

TABLE 1

| Polyurethane | Additive parts by weight | Viscosity Stormer, KU | ICI, Poise |
| --- | --- | --- | --- |
| Example 1 | 7.8 | 135 | 2.0 |
| Example 2 | 7.8 | 93 | 1.8 |
| Example 3 | 7.8 | 103 | 2.2 |
| Example 4 | 7.8 | 108 | 2.8 |
| Example 5 | 7.8 | 99 | 3.2 |
| Comparison 1 | 7.8 | 81 | 0.9 |

From these results appears that the polyurethane according to the invention imparts to the paint ICI-viscosities of about 2–3 poise, which is an excellent ICI-viscosity for high-gloss paints. Also, the viscosity of paints at low shear rates is on the right level.

EXAMPLE 7

A semi-glossy paint having a PVC of 28% was produced by first preparing a pigment dispersion having the following composition.

| Component | Parts by weight |
| --- | --- |
| Water | 242.3 |
| Associative non-ionic cellulose ether (BERMOCOLL EHM 100) | 3.0 |
| Anti-foaming agent (BERMODOL DEF 2420) | 1.0 |
| Polyacrylic acid salt (BERMODOL DSP 2310) | 4.0 |
| Bactericide (NUOSEPT 95) | 1.0 |
| Titanium dioxide (KRONOS 2190) | 178.0 |
| Calcium carbonate (HYDROCARB) | 108.8 |

538.1 parts by weight of this pigment dispersion were thereafter mixed with 461.9 parts by weight of the following binder dispersion.

| Component | Parts by weight |
| --- | --- |
| Polyurethane | 0.9 |
| Water | 7.8 |
| $C_{12}$-ester alcohol (TEXANOL) | 13.1 |
| Anti-foaming agent (BERMODOL DEF 2420) | 3.0 |
| Acrylate latex (MULTILOBE 200) | 437.1 |

The resulting paint was thereafter tested for Stormer- and ICI-viscosity. The following results were obtained.

TABLE 2

| Polyurethane | Viscosity | |
| --- | --- | --- |
| | Stormer, KU | ICI, Poise |
| Without polyurethane | 69 | 1.3 |
| Example 1 | 100 | 1.5 |
| Example 2 | 78 | 1.5 |
| Enample 3 | 80 | 1.6 |
| Example 4 | 87 | 1.7 |
| Example 5 | 86 | 1.6 |
| Comparison 1 | 71 | 1.3 |

From these results appears that such a small addition as 0.09% gives a considerable increase of the ICI-viscosity while the polyurethane in the comparative test did not give any measurable increase of the ICI-viscosity at this level of addition.

What is claimed is:

1. A water-soluble polyurethane, comprising:
   (a) a polymer backbone;
   (b) end groups provided on the ends of the polymer backbone and containing water-soluble oxyethylene groups having a molecular weight ranging from 400 to 15,000;
   (c) groups pendant from the polymer backbone and containing hydrocarbon groups having 8–22 carbon atoms, in a number of at least 0.1 per urethane bond; and
   (d) a segment contained within the polymer backbone having a formula IIa:

wherein R is a hydrophobic group pendant from the polymer backbone and contains a monovalent hydrocarbon group having 8–22 carbon atoms, A is an oxyalkylene group having 2–4 carbon atoms, B is a trivalent group, and m and n range from 20–140 and have a sum, m+n, which is 50–200, and the number of oxyethylene units being such that the polyurethane becomes water-soluble.

2. The water-soluble polyurethane according to claim 1, wherein the end groups have a molecular weight ranging from 1,000–8,000, and wherein the groups pendant from the polymer backbone are present in a number of at least 0.4 per urethane bond, and wherein the sum, m+n, is 80–140.

3. The water-soluble polyurethane as claimed in claim 1, wherein the end groups have a formula I:

wherein A is an oxyalkylene group having 2–4 carbon atoms; B is a trivalent group; $R_1$ is a group containing a monovalent hydrocarbon group having 1–22 carbon atoms, hydrogen or the group $(A)_sH$; t is 0 or 1; and p, r and s, independently of each other, range from 1–100 and have a sum, p+r+s, which is at least 10.

4. The water-soluble polyurethane as claimed in claim 3, wherein B is one of nitrogen or a —OCH—CHR$_3$—O— group; $R_1$ is a group containing a monovalent hydrocarbon group having 1–14 carbon atoms, hydrogen or the group $(A)_sH$; $R_3$ is hydrogen or a hydrocarbon group having 1–7 carbon atoms; and p, r and s, independently of each other, range from 20–80.

5. The water-soluble polyurethane as claimed in claim 3, wherein at least 50% by weight of the polyurethane consists of:
   the polymer backbone segment having a formula IIa, and
   a polymer backbone segment having a formula IIb:

wherein T is a bivalent hydrocarbon group with 1–24 carbon atoms.

6. The water-soluble polyurethane as claimed in claim 5, wherein R is an acyclic hydrocarbon group or an acyl group, B is nitrogen, and at least 50% of all the A's are oxyethylene groups.

7. The water-soluble polyurethane as claimed in claim 3, wherein t is 1, and $R_1$ and R, p and m and r and n are pairwise equal.

8. The water-soluble polyurethane as claimed in claim 3, wherein t is 0.

9. The water-soluble polyurethane as claimed in claim 1, wherein the water-soluble polyurethane has a viscosity ranging from 100–20,000 mPa·s, measured in a 20% aqueous solution at 20° C. according to Brookfield at 12 rpm.

10. The water-soluble polyurethane as claimed in claim 9, wherein the water-soluble polyurethane has a viscosity ranging from 500–10,000 mPa·s, measured in a 20% aqueous solution at 20° C. according to Brookfield at 12 rpm.

11. The process of thickening a water-based system, comprising:
    (a) providing a water-soluble polyurethane as claimed in claim 9; and (b) admixing the water-soluble polyurethane to the water-based system, whereby the water-based system is thickened.

12. The process as claimed in claim 11, wherein the water-based system is a water-based paint.

13. The process as claimed in claim 12, wherein the water-based paint is a latex paint.

14. The water-soluble polyurethane as claimed in claim 1, wherein R is a hydrophobic group, containing a monovalent hydrocarbon group having 10–14 carbon atoms; m and n range from 20–140, and have a sum, m+n, ranging from 80–120.

* * * * *